May 23, 1950     Z. TAKATS     2,508,733
LATERAL FILM GUIDING MEANS
Filed Aug. 6, 1947
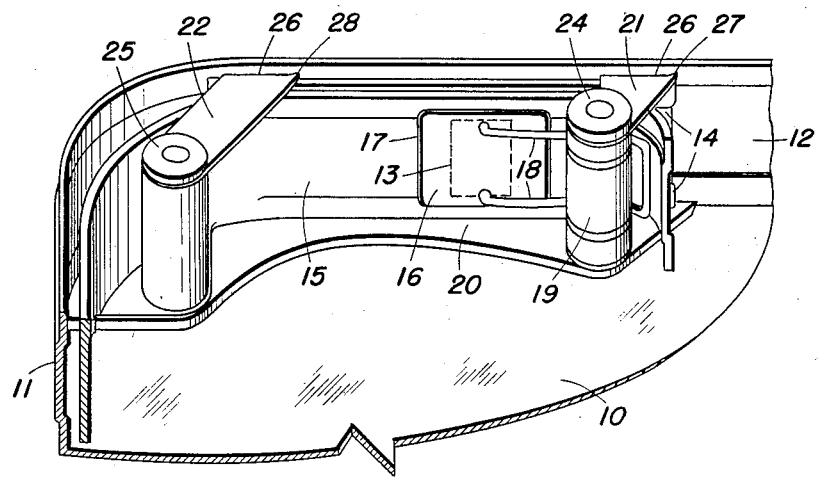
INVENTOR
Zoltan Takats
BY
ATTORNEY Patented May 23, 1950

2,508,733

UNITED STATES PATENT OFFICE 2,508,733

LATERAL FILM GUIDING MEANS

Zoltan Takats, Vestal, N. Y., assignor to General Aniline & Film Corporation, New York, N. Y., a corporation of Delaware Application August 6, 1947, Serial No. 766,508

5 Claims. (Cl. 88—17)

This application relates to improved lateral film guiding means, particularly for use in motion picture cameras.

In motion picture cameras of a type commonly used by amateur photographers, it is customary to provide a film magazine adapted to be mounted in the camera for exposure of the film, and also employed as a container for transporting the film to and from the user. The film magazine has an aperture or gate in the wall facing the camera lens, past which the film is advanced during operation of the camera, said aperture defining the limits of the successively exposed areas or frames of the film.

To insure sharpness of the image, film positioning means is customarily provided for maintaining the film accurately in the focal plane of the camera lens as the film passes the gate. It is necessary also, however, to provide lateral guide means for maintaining the film in alignment as it passes the gate, since lateral displacement of the film would cause the successive images thereof to yield an unsteady picture when projected on a screen. Such guide means must overcome the tendence of the film to sway laterally by reason of slight unevenness of its edges and unequal tension applied by operation of the film advancing mechanism.

Various constructions have been proposed heretofore for lateral film guiding means, but in most cases they have been subject to a number of disadvantages in their manufacture, assembly or operation. Thus, rigid film guiding means engaging both edges of the film fails to accommodate variations in the width of the film, and may cause slight buckling as the film passes the gate, impairing the sharpness of some of the images recorded on the film. Some of the devices heretofore proposed offer excessive resistance to the advancement of the film, and are liable, therefore, to cause stretching or rupture of the film. Often guide means heretofore proposed included a relatively large number of parts, rendering their manufacture and assembly tedious and expensive. Others were inconvenient to manipulate for threading the film through the device during loading, constituting a particularly objectionable feature in view of the fact that such manipulation must be carried out in the dark. Once the magazine is loaded and the guiding device adjusted for operation, it is necessary that its adjustment be reliably maintained not only during advancement of the film but also when the magazine is subjected to rough handling during transportation.

It is an object of this invention to provide lateral film guiding means, in a film magazine of the aforesaid type, requiring relatively few parts of simple design, which can be easily and cheaply manufactured and assembled with the other parts of the magazine.

It is likewise an object of the invention to provide lateral film guiding means which applies moderate resilient pressure to one edge of the film as it passes the gate, so as to hold it reliably in alignment without tendency to offer excessive resistance to film advancement, and adapting it at the same time to accommodate minor variations in the width of the film.

Still another object is to provide film guiding means which can be manipulated with utmost facility, for loading the film in the magazine, especially in the dark; and which, when adjusted for film guiding operation, reliably maintains this adjustment during advancement of the film, and also during shipment of the loaded magazine.

Film magazines of a type commonly employed for the aforesaid purpose comprise film locating means such as an aperture plate, extending around the aperture or gate on the inner wall of the magazine, having a plane surface for engaging the front of the film as it passes the gate, and being adapted thereby to locate the film in the focal plane of the lens of the camera in which the magazine is mounted. Means for supporting the rear of the film ordinarily comprises a runway pad extending past the gate, adjacent and parallel to the aperture plate. Pressure means, such as a pressure pad, is also employed, resiliently urged toward the aperture plate at the aperture, for holding the film against the surface of said plate as the film passes the gate. The runway pad itself may be urged toward the aperture plate to hold the film in the desired position, in which case a separate pressure pad can be omitted. The film is withdrawn from a pay-off reel, passing around the runway pad and between the pressure pad and aperture plate, and is rewound on a take-up reel within the magazine.

In accordance with my invention, fixed film-edge-supporting means or aligning means is provided for engaging one edge of the film as it passes the gate, comprising for example a plurality of aligned supports adapted to locate one edge of the film in lateral direction, said fixed aligning means extending from the runway pad to the aperture plate. For cooperation therewith, I provide resilient film-edge-engaging means, adapted to exert moderate pressure on the opposite edge of the film so as to hold the latter against the aforesaid fixed film edge aligning means. The resilient film-edge-engaging means comprises a pair of resilient clips, pivotally mounted on suitable supports adjacent opposite ends of the gate, behind the runway pad or path of the film, and rotatable about their pivots, in a plane substantially perpendicular to that of the film, between an operating position in which their free ends extend across the runway pad to intersect the path of the film and engage the edge thereof, and an inoperative position in which their free ends are retracted out of the path of the film. The aforesaid clips are advantageously constructed of flexible resilient material, mounted so that they are flexed by the film to exert moderate resilient pressure laterally against its edge and likewise to accommodate any minor variations in the width of the film.

Preferably the aforesaid clips are constructed and mounted to engage stop means (e. g., the wall of the magazine), adapted to arrest their pivotal movement in the aforesaid operative position, the clips likewise being of such length that when moved to said position, they extend diagonally from their pivots in a rearward direction with reference to the direction of the film advancement. By virtue of this arrangement, the frictional force applied to the clips by the film as it is advanced tends to hold the clips against the aforesaid stop means and thereby maintains them in operative film guiding position during film advancement.

To minimize frictional resistance to film advancement, a tip portion of each clip, on the side initially encountered by the film, is bent outward away from the edge of the film to form a smooth, curved anti-friction surface, tangent to the film edge, which eliminates any danger of the clip catching in a nick or irregularity of the film.

The pivotal mounting preferably includes friction means for restraining clips against casual displacement, once they are adjusted in operative position, friction means being fully adequate to maintain the clips in operative position during shipment of the magazine when loaded.

To load the magazine, the clips are manually retracted so that the film may be readily inserted between the aperture plate and the runway pad. The clips are then moved to operative position until such movement is arrested by the stop means provided for this purpose. These manipulations can be effected with utmost facility without visual aid, and can therefore be conveniently carried out in the dark.

Further objects and advantages will appear from the following description of a preferred embodiment of my invention, taken in conjunction with the accompanying drawing, wherein:

The drawing shows a perspective view of a portion of the interior of a film magazine, with film guiding means of my invention mounted therein.

Referring to the drawing, the film magazine therein illustrated comprises a sidewall 10, and end and front walls 11 and 12, the latter including an aperture 13 (indicated in dotted lines) constituting the gate which defines the limits of the image to be recorded on successive frames of a film strip.

An aperture plate 14 having flat film-engaging surface portions for locating the front surface of the film, extends around the aperture or gate 13, and is secured to the front wall 12 of the magazine.

For supporting the rear of the film as it advances past the aperture or gate 13, a runway pad 15 is provided having a straight portion facing the aperture plate 14 and spaced sufficiently therefrom to permit a film strip to pass between the two members. The ends of the runway pad curve rearwardly to conduct the film to and from a pair of reels (not shown). To hold the film against the aperture plate 14, a pressure pad 16 is disposed behind the aperture or gate 13, in an opening 17 in the runway pad; and is resiliently urged by springs 18 mounted on post 19 toward the aperture plate 14, so as to hold a film passing between the pressure pad and aperture plate against the locating surface of the latter, thereby maintaining the film in the focal plane of the camera lens.

Fixed film edge guiding means is provided, for example, by plate 20 secured to sidewall 10 of the magazine casing, and extending to the aperture plate 14 or to the front wall 12 of the casing. Plate 20 has a smooth, flat, marginal portion adjoining the aperture plate 14, and aligned with the desired direction of film advancement so as to support and align one edge of the film as it passes the gate 13.

In accordance with my invention, means for guiding the opposite edge of the film is provided comprising a pair of clips 21 and 22, mounted respectively on the upper ends of posts 19 and 23, for pivotal movement about the axes of the latter. The pivotal mounting of these clips preferably includes friction means for restraining the clips against casual displacement, said friction means comprising, for example, lock nuts 24 and 25 equipped with resilient lock washers or equivalent friction devices engaging the surface of the clips.

Clips 21 and 22 can be made of resilient sheet metal such as sheet steel or brass, and are adapted to flex resiliency in the radial plane of their pivotal mountings. The clips 21 and 22 are, moreover, of sufficient length to extend across the edge of runway pad 15, and to intersect the path of the film supported thereby. Thus, they are adapted to exert moderate resilient pressure in lateral direction against the edge of the film to hold its opposite edge firmly against the fixed guiding and aligning surface of plate 20.

Clips 21 and 22 are, moreover, of sufficient length to encounter stop means, for example, the front wall 12 of the magazine casing, when the clips are swung over the runway pad 14 to operative positions, their ends being advantageously cut diagonally, as indicated at 26, to permit them to lie flat against the wall 12 when moved into contact therewith. When the clips are in operative position, preferably they slant rearwardly with respect to the direction of film advancement (i. e., from right to left in the drawing). Thus, when the clips are in contact with the edge of the advancing film, the frictional force exerted by the latter on the clips tends to hold their ends against the front side wall 12, or other stop means, reliably holding them in film guiding position during operation of the camera.

The tip portions 27 and 28 of the clips 21 and 22, on the side facing the oncoming film, are bent upward as shown, to provide a smooth, curved, anti-friction surface forming a tangent with the line of contact with the edge of the film, and thus eliminating any tendency of the clip to catch in nicks or similar irregularities in the edge of the film. The upturned tips 27 and 28 can be arranged to engage the cover of the magazine casing for positioning the clips transversely of the film, but this is not necessary in view of the resilience of the clips as hereinbefore described.

The film edge guide clips of my invention can be readily and economically manufactured by simple stamping or similar forming operations, and can be assembled with the other parts of the casing with minimum effort.

For loading the magazine, the clips 21 and 22 are swung away from the magazine front wall 12, and after insertion of the film, between the runway pad 15 or pressure pad 16, and the aperture plate 14, they are swung back until their free ends contact the wall 12, such adjustment being easily and conveniently carried out in the dark.

During shipment, the clips are firmly held in film guiding position by simple frictional mounting means; while during advancement of the film, frictional engagement with the film edge maintains the clips in film engaging position.

Variations and modifications can be made in the structure of the accompanying drawing and the foregoing description without departing from the scope of my invention, and parts thereof can be used without others.

I claim:

1. In a film magazine for motion picture cameras, having an image defining aperture and means for positioning a film in the focal plane of the camera lens with which the magazine is employed, lateral guide means for the film comprising fixed aligning means for supporting one edge of the film during advancement past said aperture, and a pair of resilient clips mounted adjacent to the path of the film and respectively adjacent the opposite ends of said aperture, for movement across said path between a film disengaging position and a film engaging position in which the clips are in contact with the edge of the film, said clips thereupon exerting resilient lateral pressure against the edge of the film to hold the opposite edge of the same against said fixed aligning means for maintaining the film in alignment; and means limiting said movement of the clips in a film engaging position, movement of said clips from film engaging toward film disengaging position being in such direction as to move the portions of the clips in contact with the film edge counter to the direction of film advancement, whereby the clips are urged toward said limiting means in response to frictional engagement with the edge of a film during film advancement.

2. In a film magazine for motion picture cameras, having an image defining aperture and means for positioning a film in the focal plane of the camera lens with which the magazine is employed, lateral guide means for the film comprising fixed aligning means for supporting one edge of the film during advancement past said aperture, and a pair of resilient clips pivotally mounted on supports to the rear of the path of the film and adjacent the opposite ends of said aperture, so as to swing across said path into contact with the edge of the film, said clips thereupon exerting resilient lateral pressure against the edge of the film to hold the opposite edge of the same against said fixed aligning means for maintaining the film alignment; and stop means for arresting pivotal movement of said clips in limiting film edge engaging position, said clips being of such length that they slant rearwardly in the direction of film advancement when their ends are moved into engagement with said stop means.

3. In a film magazine for motion picture cameras, having an image defining aperture and means for positioning a film in the focal plane of the camera lens with which the magazine is employed, lateral guide means for the film comprising fixed aligning means for supporting one edge of the film during advancement past said aperture, and a pair of resilient clips pivotally mounted on supports to the rear of the path of the film and adjacent the opposite ends of said aperture, so as to swing across said path into contact with the edge of the film, said clips thereupon exerting resilient lateral pressure against the edge of the film to hold the opposite edge of the same against said fixed aligning means for maintaining the film alignment; said clips having curved surface portions lying in the line of film edge contact, on the side of the clips initially encountered by the film, said curved tip portions thus forming a tangent with the edge of the film to provide a smooth anti-friction initial surface contact with the edge of the film.

4. In a film magazine for a motion picture camera having an image defining aperture, a runway pad for supporting the rear of the film as it passes said aperture, an aperture plate around said aperture for engaging the front of the film to position the same in the focal plane of the camera lens, and means for holding the film against said aperture plate, lateral guide means for the film comprising fixed aligning means for supporting one edge of the film during advancement past said aperture, and a pair of resilient clips pivotally mounted on supports to the rear of said runway pad and adjacent opposite ends of said aperture, so as to swing in a plane perpendicular to the plane of the film across said runway pad into contact with the edge of the film, and being resiliently flexible in a radial plane of their respective pivot axes to exert yielding lateral pressure against the edge of the film for holding its opposite edge against said fixed aligning means; said clips being of such length and shape as to form line contact with the fixed portion of the magazine when swung to film engaging position, such engagement limiting movement of the clips across said runway pad and arresting the clips in a position in which they slant rearwardly with respect to the direction of the film advancement.

5. Lateral film guiding means as defined in claim 4 wherein the tips of said clips on the side initially contacted by the film, are bent outward away from the film to present a smooth, curved, anti-friction surface tangent to the edge of the film for initial contact therewith.

ZOLTAN TAKATS.

REFERENCES CITED

The following references are of record in the file of this patent:

UNITED STATES PATENTS

| Number | Name | Date |
| --- | --- | --- |
| 1,944,033 | Proctor | Jan. 16, 1934 |
| 2,103,369 | Howell | Dec. 28, 1937 |
| 2,225,021 | Schwenk | Dec. 17, 1940 |